(12) United States Patent
Jung et al.

(10) Patent No.: US 12,360,055 B2
(45) Date of Patent: Jul. 15, 2025

(54) INSPECTION SYSTEM AND INSPECTION METHOD USING THE SAME

(71) Applicant: Samsung Display Co., Ltd., Yongin-si (KR)

(72) Inventors: Sungwoo Jung, Cheonan-si (KR); Hyeonsuk Guak, Suwon-si (KR); Jaewoo Jung, Gwangmyeong-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 237 days.

(21) Appl. No.: 18/107,648

(22) Filed: Feb. 9, 2023

(65) Prior Publication Data
US 2023/0417681 A1    Dec. 28, 2023

(30) Foreign Application Priority Data

Jun. 27, 2022  (KR) .................. 10-2022-0078141
Aug. 16, 2022  (KR) .................. 10-2022-0102220

(51) Int. Cl.
*G01N 21/95* (2006.01)
*G01N 21/55* (2014.01)
*G01N 21/88* (2006.01)

(52) U.S. Cl.
CPC .............. *G01N 21/95* (2013.01); *G01N 21/55* (2013.01); *G01N 21/8806* (2013.01); *G01N 2201/0633* (2013.01)

(58) Field of Classification Search
CPC ........... G01N 21/6456; G01N 21/6445; G01N 21/21; G01N 21/4795; G01N 21/78; G01N 2021/1787; G01N 21/6486; G01N 21/8483; G01N 21/253; G01N 21/31; G01N 33/54386; G01N 21/6452;
(Continued)

(56) References Cited

U.S. PATENT DOCUMENTS 6,975,410 B1 * 12/2005 Sturgill ................ G01B 11/06
                                              356/631
7,483,128 B2 *  1/2009 Kanzaki ............... G01N 21/956
                                              356/237.4
(Continued)

FOREIGN PATENT DOCUMENTS

DE        10210209 A1 *  9/2003  ........ G01M 11/0285
JP     2002055055 A   *  2/2002
(Continued)

*Primary Examiner* — Michael P Stafira
(74) *Attorney, Agent, or Firm* — CANTOR COLBURN LLP

(57) ABSTRACT

An inspection system includes: a single light source part which irradiates an incident light to an inspection object; a main lens through which reflected light, reflected from an inspection object and including a first polarization component and a second polarization component, passes; a beam splitter which splits a reflected light passing through a main lens into a first split light and a second split light; a first polarizer including a first filter area which selectively passes a first polarization component therethrough; a second polarizer including a second filter area which selectively passes a second polarization component therethrough; and an image sensor which generates a first captured image for a first polarization component and a second captured image for a second polarization component.

18 Claims, 12 Drawing Sheets

(58) Field of Classification Search
CPC ......... G01N 2201/0683; G01N 33/543; G01N 33/54313; G01N 33/54373; G01N 33/54393; G01N 2201/0221; G01N 33/2858; G01N 2021/177; G01N 2021/217; G01N 2021/6439; G01N 2021/6463; G01N 21/6428; G01N 21/6458; G01N 21/648; G01N 21/84; G01N 2201/0632; G01N 2201/064; G01N 2201/065; G01N 33/483; G01N 33/553; G01N 15/0205; G01N 2021/3144; G01N 2021/3155; G01N 21/05; G01N 21/55; G01N 2201/0627; G01N 15/0227; G01N 2021/6417; G01N 2021/6471; G01N 2021/8848; G01N 21/49; G01N 21/645; G01N 21/76; G01N 21/8806; G01N 2496/05; G01N 33/5094; G01N 1/42; G01N 2021/4707; G01N 2021/8845; G01N 21/27; G01N 21/39; G01N 21/51; G01N 21/88; G01N 21/95684; G01N 35/028; G01N 2021/8825; G01N 2021/9513; G01N 21/17; G01N 21/4738; G01N 21/553; G01N 21/8851; G01N 21/90; G01N 21/9027; G01N 21/9036; G01N 21/95; G01N 2201/0633; G02B 27/0172; G02B 27/0093; G02B 2027/0178; G02B 2027/0138; G02B 2027/014; G02B 30/52; G02B 2027/0123; G02B 2027/0134; G02B 2027/0187; G02B 27/141; G02B 5/3016; G02B 27/0176; G02B 2027/0174; G02B 27/0103; G02B 27/1006; G02B 27/30; G02B 30/26; G02B 6/005; G02B 6/0076; G02B 5/3083; G02B 27/28; G02B 5/30; G02B 1/06; G02B 26/023; G02B 5/025; G02B 5/20; G02B 13/0045; G02B 13/06; G02B 1/11; G02B 27/0101; G02B 27/288; G02B 6/0056; G02B 2027/0118; G02B 27/286; G02B 5/3025; G02B 30/25; G02B 5/08; G02B 5/305; G02B 6/0053; G02B 27/283; G02B 5/0841; G02B 6/0051; G02B 6/35; G02B 6/3504; G02B 6/3574; G02B 27/01; G02B 27/281; G02B 5/02; G02B 6/0055; G02B 21/0008; G02B 21/0076; G02B 21/12; G02B 1/10; G02B 21/16; G02B 21/24; G02B 27/026; G02B 27/144; G02B 7/023; G02B 2027/012; G02B 27/149; G02B 2027/013; G02B 2027/0141; G02B 2027/0163; G02B 2027/0183; G02B 27/0149; G02B 27/0179; G02B 30/24; G02B 5/23; G02B 5/26; G02B 5/3033; G02B 5/3058; G02B 6/0031; G02B 21/0004; G02B 21/0092; G02B 21/34; G02B 26/0833; G02B 27/024; G02B 27/32; G02B 5/003; G02B 5/04; G02B 1/02; G02B 1/041; G02B 13/003; G02B 13/006; G02B 13/14; G02B 17/006; G02B 17/0856; G02B 19/0066; G02B 2003/0093; G02B 2027/0125; G02B 2027/0127; G02B 2027/0147; G02B 21/084; G02B 21/361; G02B 27/16; G02B 27/20; G02B 3/08; G02B 30/60; G02B 5/0825; G02B 5/10; G02B 5/208; G02B 5/223; G02B 5/32; G02B 7/04; G02B 1/18; G02B 13/0055; G02B 13/0065; G02B 13/007; G02B 13/008; G02B 13/04; G02B 17/0804; G02B 17/086; G02B 17/0896; G02B 2027/011; G02B 2027/0185; G02B 2027/0194; G02B 21/04; G02B 23/06; G02B 26/007; G02B 27/0018; G02B 27/0025; G02B 27/0068; G02B 27/0081; G02B 27/017; G02B 27/0905; G02B 27/0944; G02B 27/0983; G02B 27/126; G02B 27/145; G02B 27/148; G02B 27/4205; G02B 27/4272; G02B 3/00; G02B 30/34; G02B 30/35; G02B 5/0215; G02B 5/0242; G02B 5/0294; G02B 5/124; G02B 5/1842; G02B 5/3008; G02B 5/3041; G02B 6/0035; G02B 6/0041; G02B 6/0065; G02B 7/02; G02B 7/021; G02B 7/08; G02B 7/36; G01B 9/02091; G01B 11/2441; G01B 11/285; G01B 11/272; G01B 11/14; G01B 11/002; G01B 9/02007; G01B 9/02; G01B 11/24; G01B 11/0675; G01B 11/168; G01B 9/02004; G01B 9/02054; G01B 9/0207; G01B 9/02077; G01B 11/026; G01B 11/25; G01B 11/303; G01B 2290/50; G01B 2290/70; G01B 9/02051; G01B 9/02098

See application file for complete search history.

(56) References Cited

U.S. PATENT DOCUMENTS

| 2006/0082782 | A1* | 4/2006 | Ogawa | G01N 21/95607 |
| | | | | 356/495 |
| 2018/0073979 | A1* | 3/2018 | Cho | H04N 23/56 |

FOREIGN PATENT DOCUMENTS

| JP | 2006098090 A | * | 4/2006 | |
| JP | 2019070617 A | * | 5/2019 | ......... G01N 21/8422 |
| JP | 2020193890 A | * | 12/2020 | |
| KR | 1020170071430 A | | 6/2017 | |
| KR | 1020170074187 A | | 6/2017 | |
| KR | 20180028787 A | * | 3/2018 | |

* cited by examiner

INSPECTION SYSTEM AND INSPECTION METHOD USING THE SAME

This application claims priority to Korean Patent Application No. 10-2022-0078141, filed on Jun. 27, 2022, and Korean Patent Application No. 10-2022-0102220, filed on Aug. 16, 2022, and all the benefits accruing therefrom under 35 U.S.C. § 119, the contents of which in their entirety are herein incorporated by reference.

BACKGROUND

1. Field

Embodiments of the invention relate to inspection system and inspection method using the inspection system.

2. Description of the Related Art

A display device may include a plurality of layers. During a manufacturing process of the display device, defects may occur in the plurality of layers. Accordingly, various inspection systems for inspecting whether the display device is defective have been developed.

SUMMARY

Embodiments provide an inspection system with improved inspection efficiency and accuracy.

Embodiments provide an inspection method using the inspection system.

An inspection system according to an embodiment includes: a single light source part which irradiates an incident light to an inspection object; a main lens through which reflected light, reflected from the inspection object and including a first polarization component and a second polarization component, passes; a beam splitter which splits the reflected light passing through the main lens into a first split light and a second split light; a first polarizer including a first filter area which selectively passes the first polarization component therethrough; a second polarizer including a second filter area which selectively passes the second polarization component therethrough; and an image sensor which generates a first captured image for the first polarization component and a second captured image for the second polarization component.

In an embodiment, the first polarization component may be obtained by reflecting the incident light from an outer surface of the inspection object, and the second polarization component may be obtained by reflecting the incident light from an inner boundary surface of the inspection object.

In an embodiment, a first polarization direction of the first polarization component and a second polarization direction of the second polarization component may be different from each other.

In an embodiment, the first polarization direction and the second polarization direction may be orthogonal to each other.

In an embodiment, an angle of incidence of the incident light with respect to a normal direction of the outer surface or the inner boundary surface may be about a Brewster angle.

In an embodiment, the incident light may be unpolarized.

In an embodiment, the light source part may include an illumination device which generates the incident light and a collimating lens which collimates the incident light.

In an embodiment, a first virtual extension line extending from a disposition surface on which the inspection object is disposed, a second virtual extension line extending from an exit surface of the main lens and a third virtual extension line extending from an incident surface of the image sensor may meet at an intersection point.

In an embodiment, the inspection object may have a curvature.

In an embodiment, the first split light and the second split light may travel in a first traveling direction, and the first polarizer and the second polarizer may be arranged in line with the beam splitter along the first traveling direction.

In an embodiment, the first polarizer may further include a first transmission area through which both the first polarization component and the second polarization component pass, and the second polarizer may further include a second transmission area through which both the first polarization component and the second polarization component pass, and the first split light may pass through the first filter area and the second transmission area, and the second split light may pass through the first transmission area and the second filter area.

In an embodiment, an area of the first filter area may be about 50% or less of the total area of the first polarizer in a view from the first traveling direction, and an area of the second filter area may be about 50% or less of a total area of the second polarizer in a view from the first traveling direction.

In an embodiment, the image sensor may be arranged in a line with the first polarizer and the second polarizer along the first traveling direction, and the image sensor may generate the first captured image and the second captured image simultaneously.

In an embodiment, the image sensor may further generate a third captured image for the non-polarization component.

In an embodiment, the main lens may be a telecentric lens.

In an embodiment, the first split light may travel in a first traveling direction, and the second split light may travel in a second traveling direction orthogonal to the first traveling direction, and the first polarizer may be arranged in a line with the beam splitter along the first traveling direction, and the second polarizer may be arranged in a line with the beam splitter along the second traveling direction.

In an embodiment, an area of the first filter area may be about 100% of the total area of the first polarizer in a view from the first traveling direction, and an area of the second filter area may be about 100% of the total area of the second polarizer in a view from the second traveling direction.

In an embodiment, the image sensor may include a first image sensor arranged in line with the first polarizer along the first traveling direction and a second image sensor arranged in line with the second polarizer along the second traveling direction, and the first image sensor may generate the first captured image and the second image sensor may generate the second captured image.

An inspection method according to an embodiment includes: irradiating an incident light from a single light source part toward an inspection object; passing a reflected light, which is reflected from the inspection object and includes a first polarization component and a second polarization component, through a main lens; splitting the reflected light passing through the main lens into a first split light and a second split light; filtering the first polarization component and the second polarization component of the first split light and the second split light, respectively; and generating a first captured image for the first polarization component and a second captured image for the second polarization component.

In an embodiment, the inspection method may further include: inspecting a defect on an outer surface of the inspection object from the first captured image; and inspecting a defect of an inner boundary surface of the inspection object from the second captured image after the first captured image and the second captured image are generated.

Therefore, the inspection system according to embodiments may include a single light source part, a main lens, a beam splitter, a first polarizer, a second polarizer, and an image sensor. Accordingly, the inspection system may simultaneously generate captured images for a plurality of polarization components through one capture. Therefore, the efficiency and accuracy of the inspection may be effectively improved.

In addition, the inspection system may obtain a single reflected light reflected from an inspection object by irradiating a single incident light to the inspection object. Also, the inspection system may split the reflected light into a plurality of split lights and filter a plurality of polarization components included in the split lights. Accordingly, even when the inspection object has a curvature, it is possible to simultaneously generate the captured images for the polarization components without an error. Accordingly, the accuracy of the inspection may be effectively improved.

It is to be understood that both the foregoing general description and the following detailed description are exemplary and explanatory and are intended to provide further explanation of the invention as claimed.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
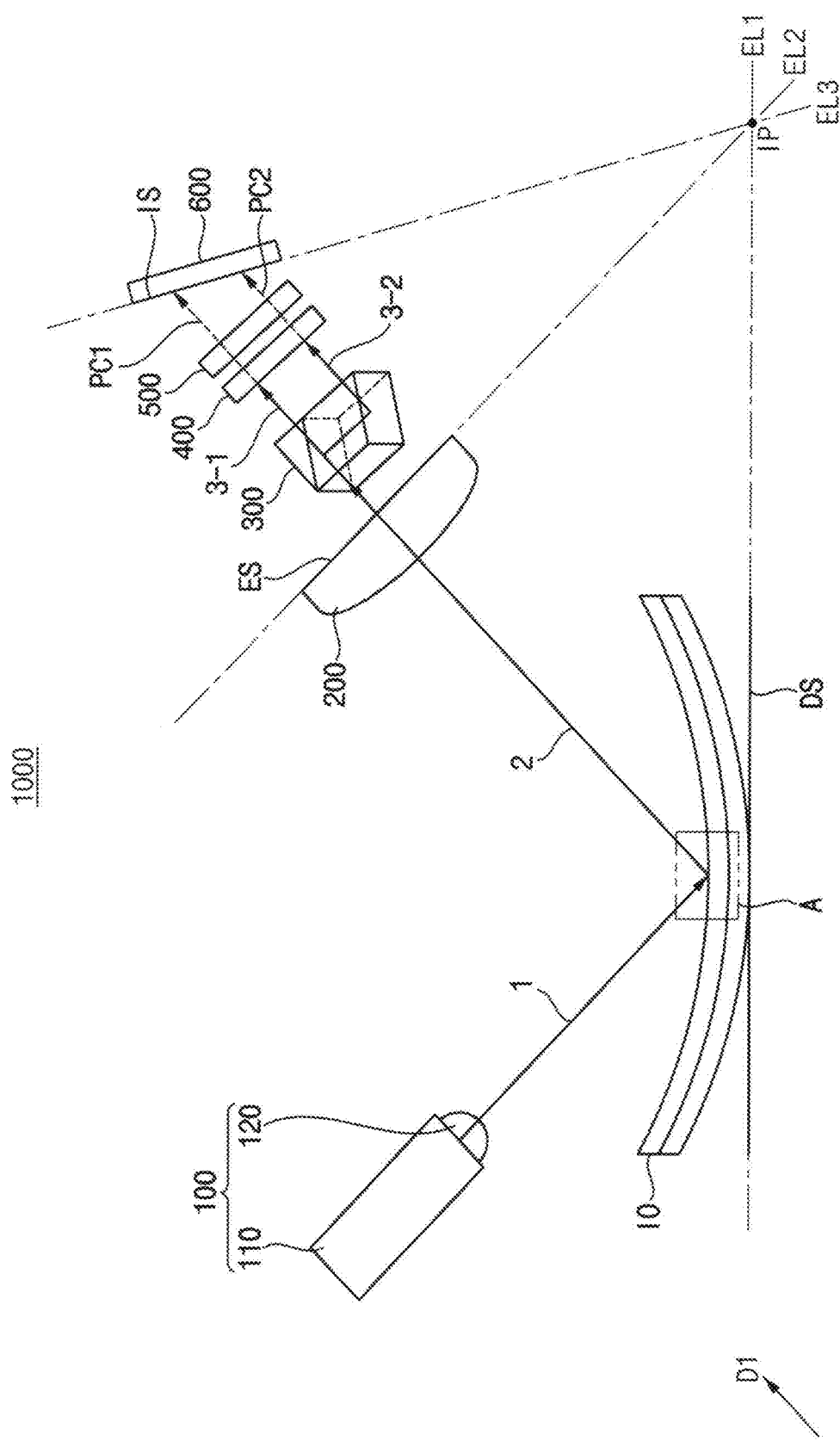
FIG. 1 is a configuration diagram illustrating an inspection system according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

FIG. 1 is a configuration diagram illustrating an inspection system according to an embodiment.

Referring to FIG. 1, the inspection system 1000 may include a single light source part 100, a main lens 200, a beam splitter 300, a first polarizer 400, a second polarizer 500, and an image sensor 600. The inspection system 1000 may inspect whether an inspection object IO is defective.

In an embodiment, the inspection object IO may have a curvature. For example, the inspection object IO may be a display device having a curvature. However, the present invention is not necessarily limited thereto, and the inspection object IO may have a flat shape in another embodiment.

In an embodiment, the light source part 100 may irradiate an incident light 1 to the inspection object M. Accordingly, the incident light 1 may be reflected from the inspection object IO to obtain the reflected light 2. In an embodiment, the light source part 100 may irradiate a single incident light 1 to the inspection object IO, in this case, the single incident light 1 is reflected from the inspection object IO to obtain the single reflected light 2.

In an embodiment, the light source part 100 may include an illumination device 110 and a collimating lens 120. The illumination device 110 may generate the incident light 1, and the collimating lens 120 may collimate the generated incident light 1. Accordingly, the light source part 100 may irradiate the collimated incident light 1 to the inspection object IO. Accordingly, the incident light 1 may more smoothly reach the inside of the inspection object IO.

Figure 2:
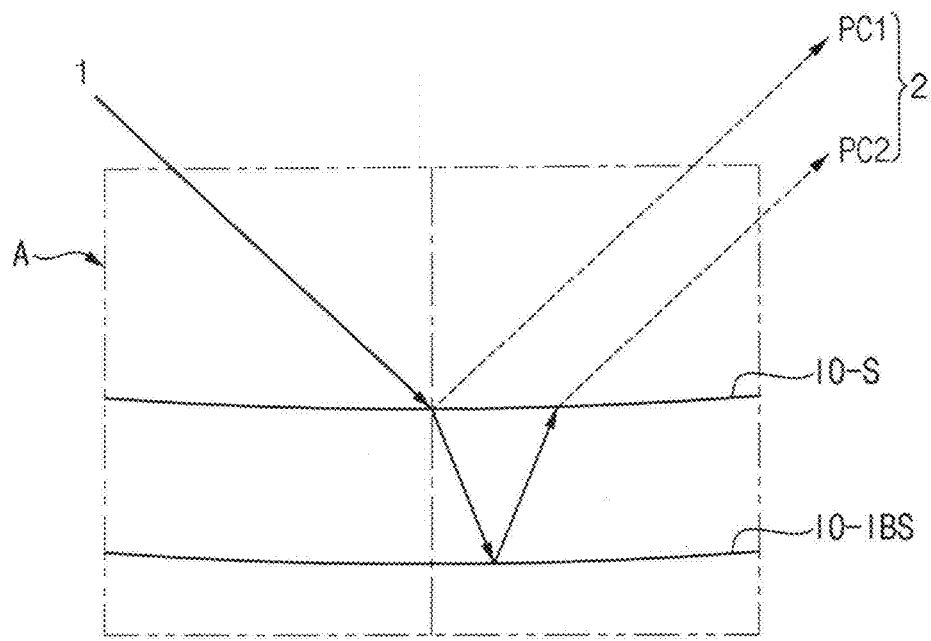
FIG. 2 is an enlarged view of an area 'A' of FIG. 1.

FIG. 2 is an enlarged view of an area 'A' of FIG. 1.

Referring to FIGS. 1 and 2, in an embodiment, the incident light 1 may be reflected from the outer surface IO-S of the inspection object IO and the inner boundary surface IO-IBS of the inspection object IO. Accordingly, the reflected light 2 may include a first polarization component PC1 and a second polarization component PC2. For example, the first polarization component PC1 may be obtained by reflecting the incident light 1 from the outer surface IO-S of the inspection object IO, and the second polarization component PC2 may be obtained by reflecting the incident light 1 from the inner boundary surface IO-IBS of the inspection object IO.

The first polarization component PC1 may have a first polarization direction, and the second polarization component PC2 may have a second polarization direction. In an embodiment, the first polarization direction of the first polarization component PC1 and the second polarization direction of the second polarization component PC2 may be different from each other. In other words, the first polarization component PC1 and the second polarization component PC2 may have different phases.

In an embodiment, the angle of incidence of the incident light 1 with respect to a normal direction of the outer surface IO-S of the inspection object IO may be a Brewster angle or an angle close to the Brewster angle. In other words, the light source part 100 may make the incident light 1 incident on the inspection object IO at the Brewster angle or an angle close to the Brewster angle. Specifically, the light source part 100 may make the incident light 1 incident on the inspection object IO at the Brewster angle.

In an embodiment, the incident light 1 may be unpolarized. When the unpolarized incident light 1 is incident on the inspection object IO at the Brewster angle, the first polarization direction of the first polarization component PC1 may be a vertical direction, and the second polarization direction of the second polarization component PC2 may be a horizontal direction. In other words, when the unpolarized incident light 1 is incident on the object IO at the Brewster angle, the first polarization direction and the second polarization direction may be orthogonal to each other.

the reflected light 2 may pass through the main lens 200. In an embodiment, the reflected light 2 may pass through the main lens 200 while traveling in a first traveling direction D1.

In an embodiment, the main lens 200 may be a telecentric lens. In this case, the main lens 200 may receive only light parallel to the first traveling direction D1. Accordingly, image distortion due to the viewing angle may be prevented or minimized. Accordingly, the accuracy of the inspection may be further improved.

The beam splitter 300 may be arranged in line with the main lens 200 along the first traveling direction D1. In an embodiment, the beam splitter 300 may split the reflected light 2 into a first split light 3-1 and a second split light 3-2. Each of the first split light 3-1 and the second split light 3-2 may include both the first polarization component PC1 and the second polarization component PC2.

In an embodiment, both the first split light 3-1 and the second split light 3-2 may travel in the first traveling direction D1. In other words, the first split light 3-1 and the second split light 3-2 may be emitted from the beam splitter 300 and travel parallel to each other in the first traveling direction D1.

In an embodiment, the first polarizer 400 and the second polarizer 500 may be arranged in line with the beam splitter 300 along the first traveling direction D1. In other words, the beam splitter 300, the first polarizer 400, and the second polarizer 500 may be sequentially arranged along the first traveling direction D1. Accordingly, the first split light 3-1 and the second split light 3-2 may sequentially pass the first polarizer 400 and the second polarizer 500 after emitted from the beam splitter 300. In an embodiment, Both the first polarizer 400 and the second polarizer 500 may be a linear polarizer.

Figure 3:
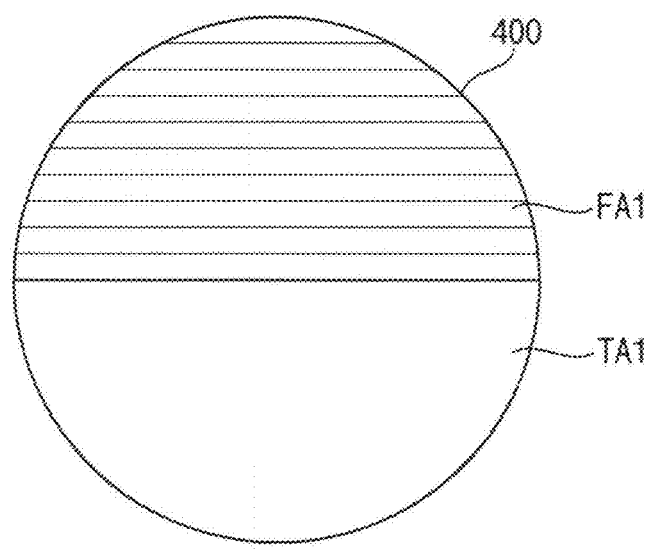
FIG. 3 is a diagram illustrating an embodiment of a first polarizer of FIG. 1 viewed from a first traveling direction.
Figure 4:
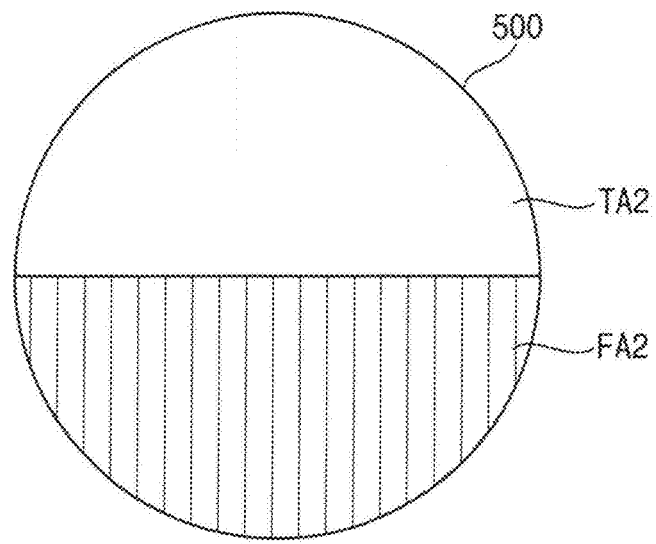
FIG. 4 is a diagram illustrating an embodiment of a second polarizer of FIG. 1 viewed from a first traveling direction.
Figure 5:
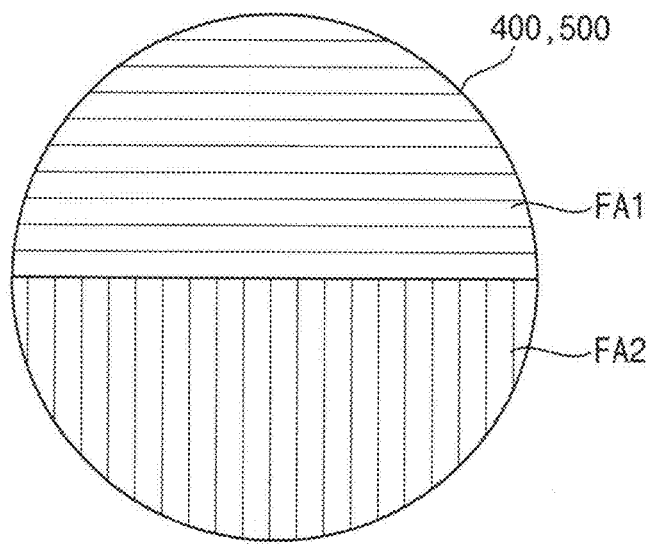
FIG. 5 is a diagram illustrating the first polarizer of FIG. 3 and the second polarizer of FIG. 4 overlapping each other when viewed from the first traveling direction.

FIG. 3 is a diagram illustrating an embodiment of the first polarizer of FIG. 1 viewed from the first traveling direction, and FIG. 4 is a diagram illustrating an embodiment of the second polarizer of FIG. 1 viewed from the first traveling direction, and FIG. 5 is a diagram illustrating the first polarizer of FIG. 3 and the second polarizer of FIG. 4 overlapping each other when viewed from the first traveling direction.

Referring to FIGS. 1 and 3 to 5, the first polarizer 400 may include a first filter area FA1 and a first transmission area TA1, and the second polarizer 500 may include a second filter area FA2 and a second transmission area TA2.

In an embodiment, the first filter area FA1 may selectively pass the first polarization component PC1 therethrough, and the second filter area FA2 may selectively pass the second polarization component PC2 therethrough, and both the transmission area TA1 and the second transmission area TA2 may pass both the first polarization component PC1 and the second polarization component PC2 therethrough.

In an embodiment, an area of the first filter area FA1 may be about 50% of the total area of the first polarizer 400 in a view from the first traveling direction D1, and an area of the second filter area FA2 may be about 50% of the total area of the second polarizer 500 in a view from the first traveling direction D1. In other words, an area of the first transmission area TA1 may be about 50% of the total area of the first polarizer 400 in a view from the first traveling direction D1, and an area of the second transmission area TA2 may be about 50% of the total area of the second polarizer 500 in a view from the first traveling direction D1.

In this case, when viewed from the first traveling direction D1, the first filter area FA1 may be spaced apart from the second filter area FA2 and may overlap an entirety of the second transmission area TA2. Also, when viewed from the first traveling direction D1, the second filter area FA2 may be spaced apart from the first filter area FA1 and may overlap an entirety of the first transmission area TA1.

For example, as shown in FIGS. 3 to 5, when the first polarizer 400 and the second polarizer 500 each have a circular shape, the first filter area FA1 may occupy an area equal to an upper semicircle of the first polarizer 400, and the second filter area FA2 may occupy an area equal to a lower semicircle of the second polarizer 500. In other words, the first transmission area TA1 may occupy an area equal to a lower semicircle of the first polarizer 400, and the second transmission area TA2 may occupy an area equal to an upper semicircle of the second polarizer 500.

In an embodiment, the first split light 3-1 may pass through the first filter area FA1 and the second transmission area TA2. Accordingly, the first split light 3-1 may have only the first polarization component PC1 after passing through the first polarizer 400 and the second polarizer 500. In other words, as the first split light 3-1 passes through the first polarizer 400 and the second polarizer 500 sequentially, the first polarization component PC1 of the first split light 3-1 and a second polarization component PC2 of the first split light 3-1 may be filtered.

In an embodiment, the second split light 3-2 may pass through the first transmission area TA1 and the second filter area FA2. Accordingly, the second split light 3-2 may have only the second polarization component PC2 after passing through the first polarizer 400 and the second polarizer 500. In other words, as the second split light 3-2 passes through the first polarizer 400 and the second polarizer 500 sequentially, the first polarization component PC1 of the second split light 3-2 and a second polarization component PC2 of the second split light 3-2 may be filtered.

Referring back to FIG. 1, the image sensor 600 may be arranged in line with the first polarizer 400 and the second polarizer 500 along the first traveling direction D1. In an embodiment, the image sensor 600 may be an area camera. Accordingly, the image sensor 600 may continuously capture an object at a preset distance interval.

Figure 6:
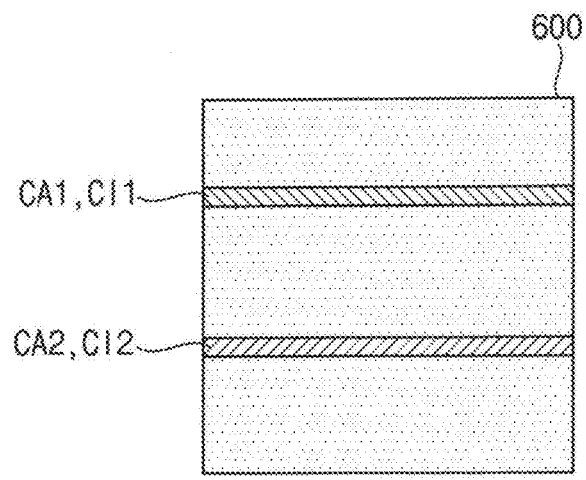
FIG. 6 is a diagram illustrating an embodiment of an image sensor of FIG. 1 viewed from the first traveling direction
Figure 7:
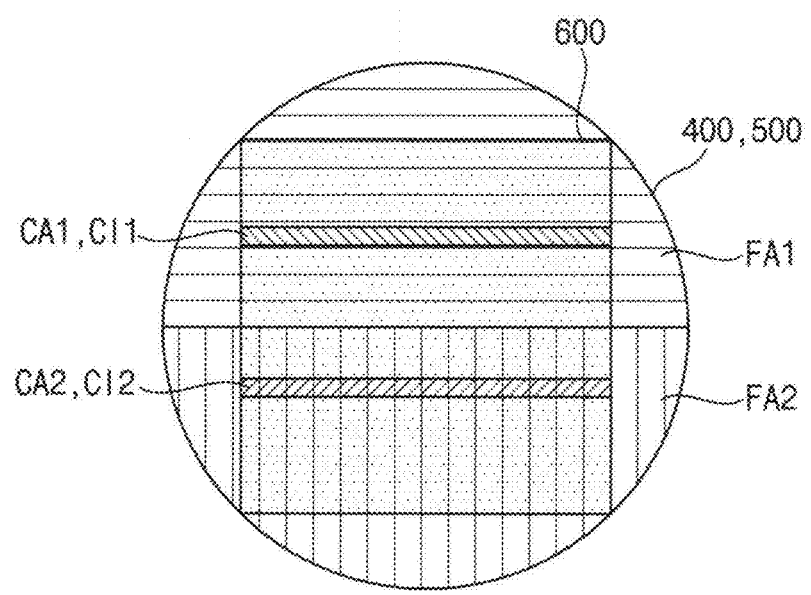
FIG. 7 is a diagram illustrating the first polarizer of FIG. 3, the second polarizer of FIG. 4 and the image sensor of FIG. 6 overlapping each other when viewed from the first traveling direction.

FIG. 6 is a diagram illustrating an embodiment of the image sensor of FIG. 1 viewed from the first traveling direction, and FIG. 7 is a diagram illustrating the first polarizer of FIG. 3, the second polarizer of FIG. 4 and the image sensor of FIG. 6 overlapping each other when viewed from the first traveling direction.

Referring to FIGS. 1, 6 and 7, in an embodiment, the image sensor 600 may include a first captured area CA1 and a second captured area CA2. As shown in FIG. 7, when viewed from the first traveling direction D1, the first captured area CA1 may overlap the first filter area FA1 and the second transmission area TA2. Also, when viewed from the first traveling direction D1, the second captured area CA2 may overlap the first transmission area TA1 and the second filter area FA2.

Accordingly, the first captured image CI1 of the first polarization component PC1 may be generated in the first capture area CA1. Also, a second captured image CI2 of the second polarization component PC2 may be generated in the second capture area CA2. In other words, the image sensor 600 may simultaneously generate the first captured image CI1 for the first polarization component PC1 and the second captured image CI2 for the second polarization component PC2.

Whether the inspection object IO is defective may be inspected by analyzing the first captured image CI1 and the second captured image CI2. In an embodiment, as shown in FIG. 2, the first polarization component PC1 may be obtained by reflecting the incident light 1 from the outer surface IO-S of the inspection object IO, the second polarization component PC2 may be obtained by reflecting the incident light 1 from the inner boundary surface IO-IBS of the inspection object IO. Accordingly, the defect of the outer surface IO-S of the inspection object may be inspected from the first captured image CI1 of the first polarization component PC1, and the defect of the inner boundary surface IO-IBS of the inspection object IO may be inspected from the second captured image CI2 of the second polarization component PC2. For example, the inspection system 1000 may inspect whether each of the outer surface IO-S of the inspection object IO and the inner boundary surface IO-IBS of the inspection object IO has pressure, protrusions, wrinkles, and the like.

Figure 8:
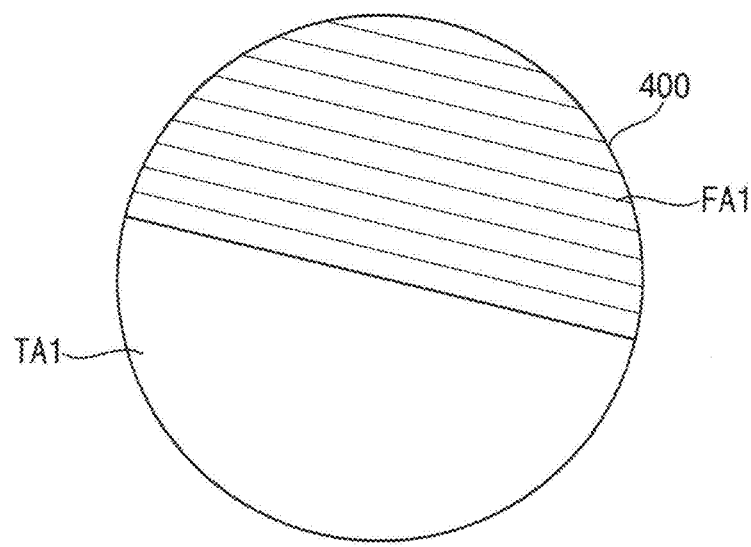
FIG. 8 is a diagram illustrating another embodiment of the first polarizer of FIG. 1 viewed from the first traveling direction.
Figure 9:
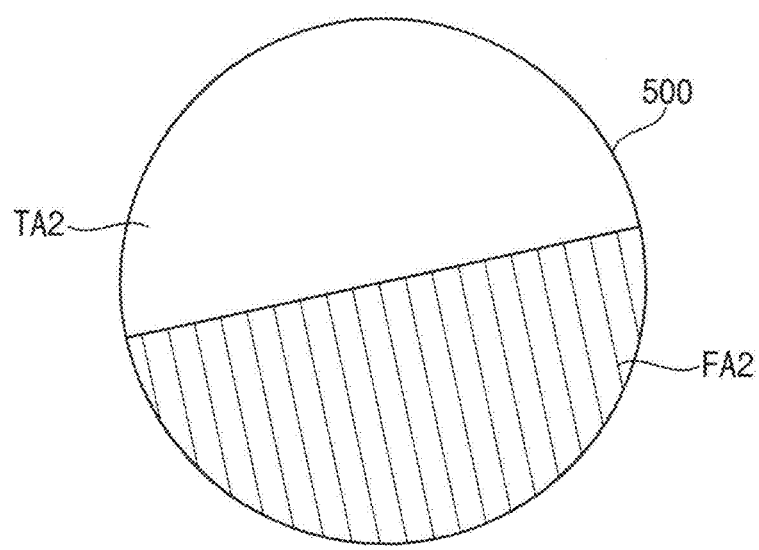
FIG. 9 is a diagram illustrating another embodiment of the second polarizer of FIG. 1 viewed from the first traveling direction
Figure 10:
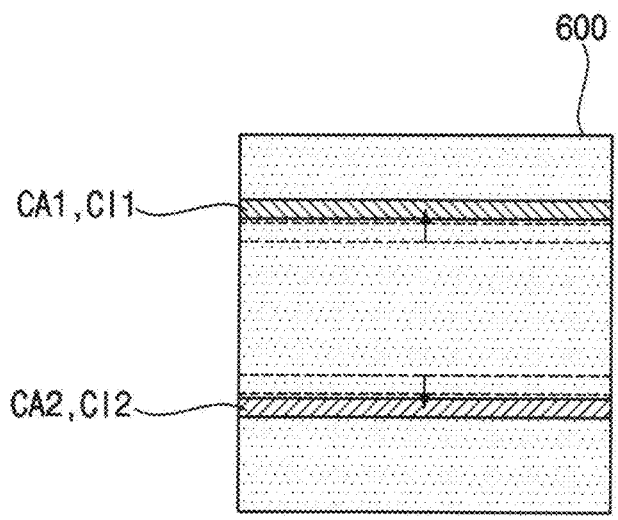
FIG. 10 is a diagram illustrating another embodiment of the image sensor of FIG. 1 viewed from the first traveling direction
Figure 11:
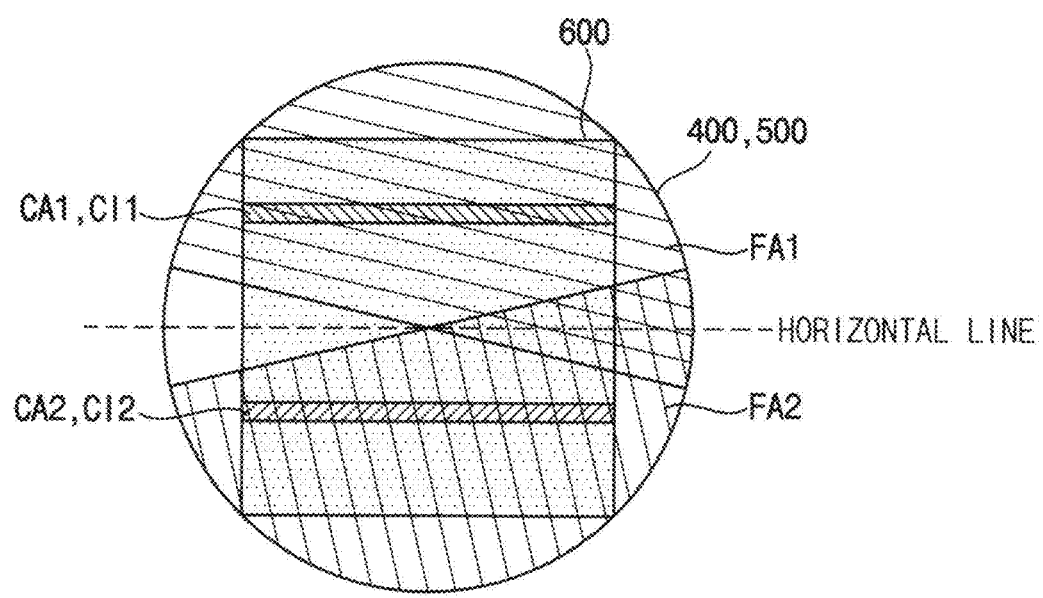
FIG. 11 is a diagram illustrating the first polarizer of FIG. 8, the second polarizer of FIG. 9 and the image sensor of FIG. 10 overlapping each other when viewed from the first traveling direction.

FIG. 8 is a diagram illustrating another embodiment of the first polarizer of FIG. 1 viewed from the first traveling direction, and FIG. 9 is a diagram illustrating another embodiment of the second polarizer of FIG. 1 viewed from the first traveling direction, and FIG. 10 is a diagram illustrating another embodiment of the image sensor of FIG. 1 viewed from the first traveling direction, and FIG. 11 is a diagram illustrating the first polarizer of FIG. 8, the second polarizer of FIG. 9 and the image sensor of FIG. 10 overlapping each other when viewed from the first traveling direction.

Referring to FIGS. 8 to 11, in an embodiment, when viewed from the first traveling direction D1, the first filter area FA1 of the first polarizer 400 may partially overlap with the filter area FA2 of the second polarizer 500. In other words, according to an angle at which the first polarizer 400 and the second polarizer 500 are arranged, when viewed from the first traveling direction D1, the first filter area FA1 and the second filter area FA2 may partially overlap.

In this case, as shown in FIG. 11, when viewed from the first traveling direction D1, the positions of the first imaging area CA1 and the second imaging area CA2 in the image sensor 600 may be changed, and the first capture area CA1 may be spaced apart from the second filter area FA2, and the second capture area CA2 may be spaced apart from the first filter area FA1. In other words, depending on the angle at which the first polarizer 400 and the second polarizer 500 are arranged, the positions of the first capture area CA1 and the second capture area CA2 in the image sensor 600 may be changed. For example, as the angle between a horizontal line (See FIG. 11) and a border line between the first filter area FA1 and the first transmission area TA1 increases, the higher the position of the first capture area CA1 in the image sensor 600 may be, and as the angle between the horizontal line (See FIG. 11) and a border line between the second filter area FA2 and the second transmission area TA2 increases, the lower the position of the second capture area CA2 in the image sensor 600 may be.

Accordingly, even when the angles at which the first polarizer 400 and the second polarizer 500 are arranged are different, the first captured image CI1 of the first polarizing component PC1 may be generated in the first capture area CA1, and the second captured image CI2 of the second polarization component PC2 may be generated in the second capture area CA2.

Figure 12:
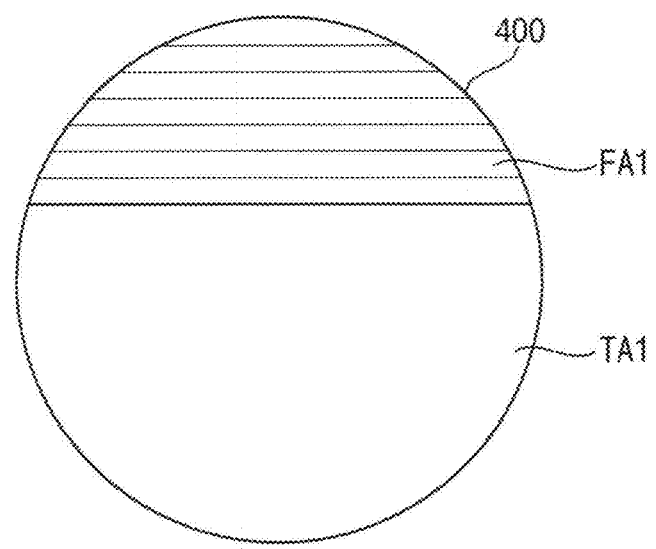
FIG. 12 is a diagram illustrating still another embodiment of the first polarizer of FIG. 1 viewed from the first traveling direction
Figure 13:
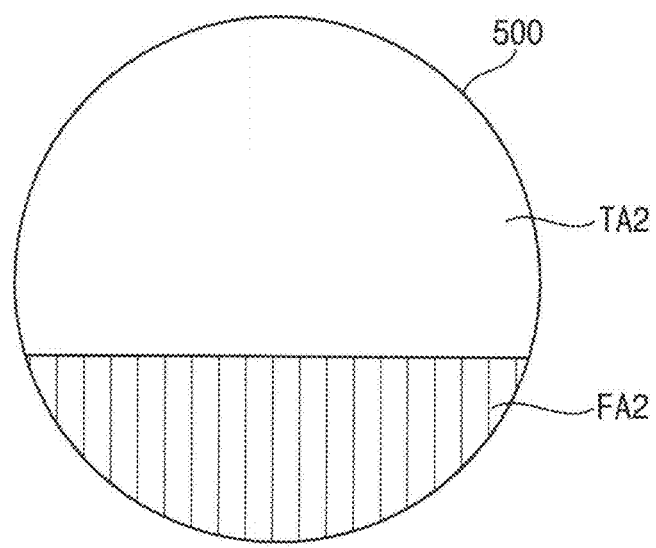
FIG. 13 is a diagram illustrating still another embodiment of the second polarizer of FIG. 1 viewed from the first traveling direction
Figure 14:
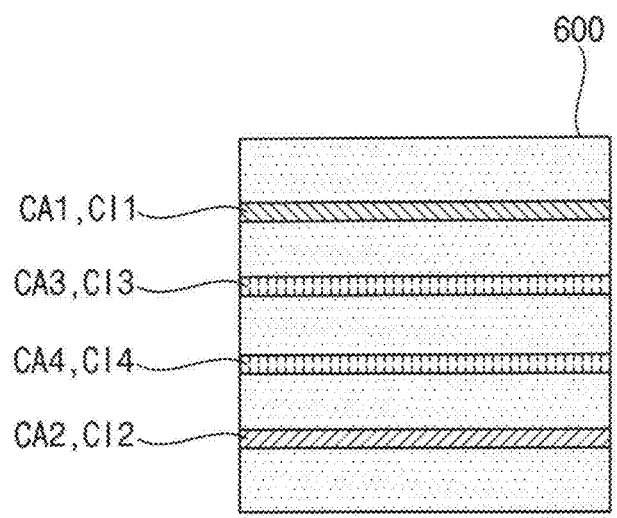
FIG. 14 is a diagram illustrating still another embodiment of the image sensor of FIG. 1 viewed from the first traveling direction
Figure 15:
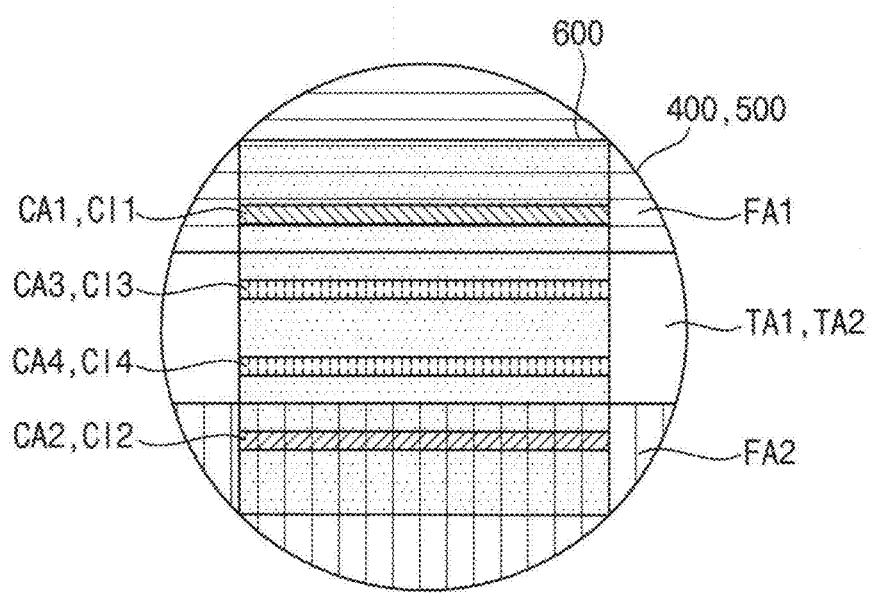
FIG. 15 is a diagram illustrating the first polarizer of FIG. 12, the second polarizer of FIG. 13 and the image sensor of FIG. 14 overlapping each other when viewed from the first traveling direction.

FIG. 12 is a diagram illustrating still another embodiment of the first polarizer of FIG. 1 viewed from the first traveling direction, and FIG. 13 is a diagram illustrating still another embodiment of the second polarizer of FIG. 1 viewed from the first traveling direction, and FIG. 14 is a diagram illustrating still another embodiment of the image sensor of FIG. 1 viewed from the first traveling direction, and FIG. 15 is a diagram illustrating the first polarizer of FIG. 12, the second polarizer of FIG. 13 and the image sensor of FIG. 14 overlapping each other when viewed from the first traveling direction.

Referring to FIGS. 12 to 15, in an embodiment, an area of the first filter area FA1 may be less than about 50% of the total area of the first polarizer 400 in a view from the first traveling direction D1, and an area of the second filter area FA2 may be less than about 50% of the total area of the second polarizer 500 in a view from the first traveling direction D1. In other words, an area of the first transmission area TA1 may be more than about 50% of the total area of the first polarizer 400 in a view from the first traveling direction D1, and an area of the second transmission area TA2 may be more than about 50% of the total area of the second polarizer 500 in a view from the first traveling direction D1. Accordingly, when viewed from the first traveling direction D1, the first transmission area TA1 and the second transmission area TA2 may partially overlap each other.

In this case, as shown in FIG. 14, the image sensor 600 may further include a third capture area CA3 and a fourth capture area CA4. When viewed from the first traveling direction D1, each of the third capture area CA3 and the fourth capture area CA4 may overlap both the first transmission area TA1 and the second transmission area TA2. Accordingly, a third captured image CI3 and a fourth captured image CI4 for a non-polarization component may be generated in the third capture area CA3 and the fourth capture area CA4, respectively.

In other words, by adjusting the area of the first filter area FA1 and the area of the second filter area FA2 to be less than 50% of the total area of each of the first polarizer 400 and the second polarizer in a view from the first traveling direction D1, the image sensor 600 may generate the first captured image CD for the first polarization component PC1, the second captured image CI2 for the second polarization component PC2, the third captured image CI3 and the fourth captured image CI4 for the non-polarization component simultaneously.

However, the present invention is not necessarily limited thereto, and the image sensor 600 may further include only one capture area overlapping both the first transmission area TA1 and the second transmission area TA2, or may further include three or more capture areas overlapping both the transmission area TA1 and the second transmission area TA2 in another embodiment.

Referring back to FIG. 1, in an embodiment, a first virtual extension line EL1 extending from the inspection object IO, a second virtual extension line EL2 extending from the main lens 200, and a third virtual extension line EL3 extending from the image sensor 600 may meet at an intersection point IP. For example, the first virtual extension line EL1 may extend from the disposition surface DS on which the inspection object IO is disposed, the second virtual extension line EL2 may extend from the exit surface ES of the main lens 200, and the third virtual extension line EL3 may extend from the incident surface IS of the image sensor 600. Accordingly, the captured images may be more accurately focused. Accordingly, the accuracy of the inspection may be further improved.

According to embodiments, the inspection system 1000 may include the single light source part 100, the main lens 200, the beam splitter 300, the first polarizer 400, the second polarizer 500, and the image sensor 600. Accordingly, the inspection system 1000 may simultaneously generate captured images of a plurality of polarization components through one capture. Accordingly, the efficiency and accuracy of the inspection may be improved.

In addition, the inspection system 1000 may obtain a single reflected light 2 reflected from the inspection object IO by irradiating a single incident light 1 to the inspection object M. Also, the inspection system 1000 may split the reflected light 2 into a plurality of split lights 3-1 and 3-2, and filter a plurality of polarization components included in the split lights 3-1 and 3-2. Accordingly, even when the inspection object IO has a curvature, the inspection system 1000 may simultaneously generate captured images of a plurality of polarization components without an error. Accordingly, the accuracy of the inspection may be effectively improved.

Figure 16:
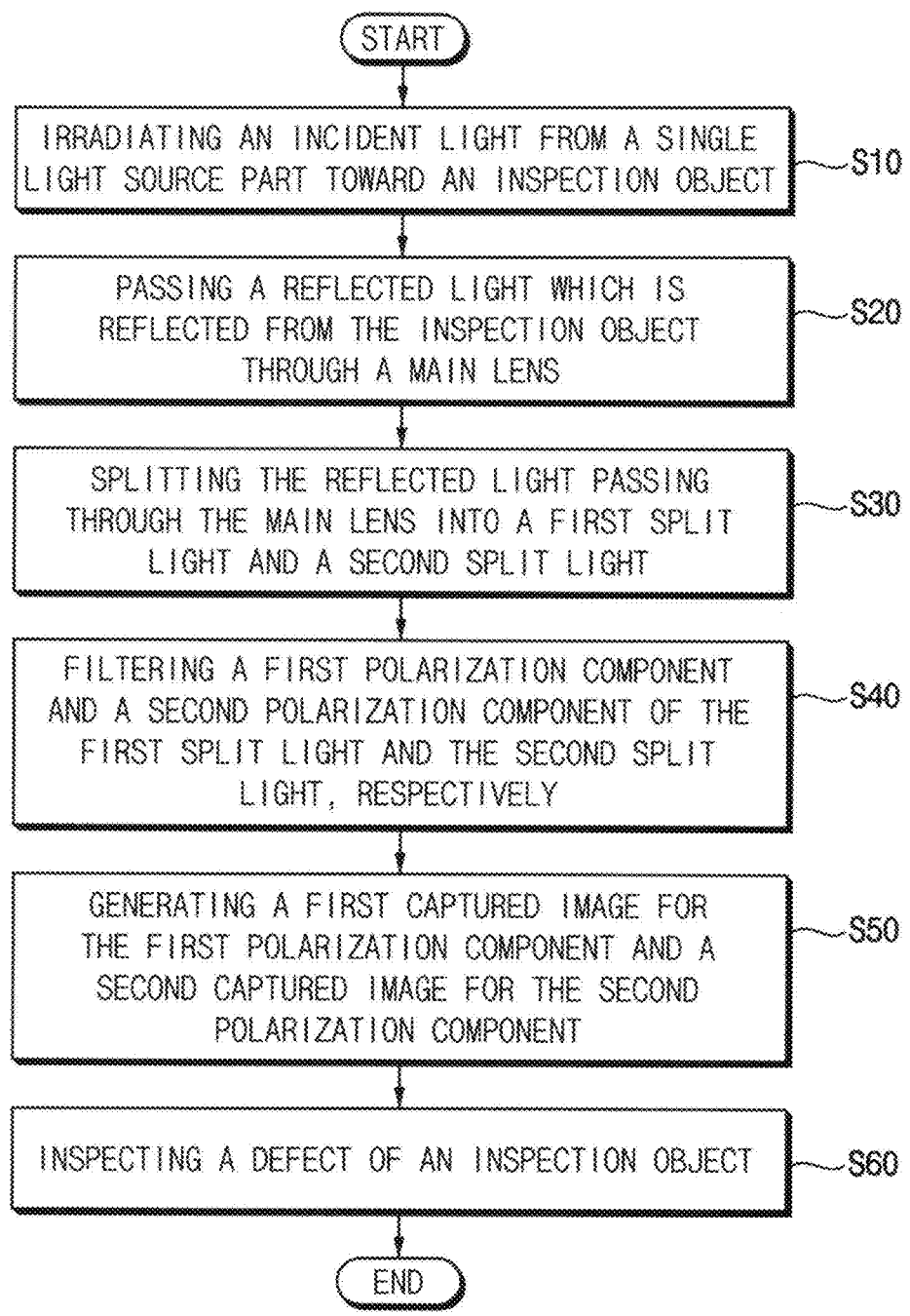
FIG. 16 is a flowchart illustrating an inspection method using the inspection system of FIG. 1.

FIG. 16 is a flowchart illustrating an inspection method using the inspection system of FIG. 1.

Hereinafter, the inspection method for inspecting defect of the inspection object IO using the inspection system 1000 will be briefly described with reference to FIGS. 1 to 6 and 16.

First, the incident light 1 is irradiated from the single light source part 100 toward the inspection object IO (S10). Thereby, the incident light 1 is reflected from the inspection object IO to the reflected light 2. In an embodiment, the light source part 100 may make the incident light 1 incident on the inspection object IO at the Brewster angle or an angle close to the Brewster angle.

The reflected light 2 reflected from the inspection object IO passes through the main lens 200 (S20). In an embodiment, the reflected light 2 may include the first polarization component PC1 and the second polarization component PC2. In an embodiment, the main lens 200 may be a telecentric lens.

The reflected light 2 passing through the main lens 200 splits into the first split light 3-1 and the second split light 3-2 by the beam splitter 300 (S30). In an embodiment, each of the first split light 3-1 and the second split light 3-2 may include the first polarization component PC1 and the second polarization component PC2. In an embodiment, the first split light 3-1 and the second split light 3-2 may be emitted from the beam splitter 300 and travel parallel to each other in the first travel direction D1.

The first polarization component PC1 and the second polarization component PC2 of each of the first split light 3-1 and the second split light 3-2 are filtered by the first polarizer 400 and the second polarizer 500, respectively (S40). In an embodiment, the first split light 3-1 may pass through the first filter area FA1 of the first polarizer 400 and the second transmission area TA2 of the second polarizer 500. Accordingly, the first split light 3-1 may have only the first polarization component PC1 after passing through the first polarizer 400 and the second polarizer 500. The second split light 3-2 may pass through the first transmission area TA1 of the first polarizer 400 and the second filter area FA2 of the second polarizer 500. Accordingly, the second split light 3-2 may have only the second polarization component PC2 after passing through the first polarizer 400 and the second polarizer 500.

The first captured image CI1 of the first polarization component PC1 and the second captured image CI2 of the second polarization component PC2 are generated by the image sensor 600 (S50). In an embodiment, the image sensor 600 may simultaneously generate the first captured image CI1 and the second captured image CI2.

The first captured image CI1 and the second captured image CI2 are analyzed to inspect whether the inspection object is defective (S60). In an embodiment, the defect of the outer surface IO-S of the inspection object IO may be inspected from the first captured image CI1 for the first polarization component PC1, and the defect of the inner boundary surface IO-IBS of the inspection object IO may be inspected from the second captured image CI2 for the second polarization component PC2.

Figure 17:
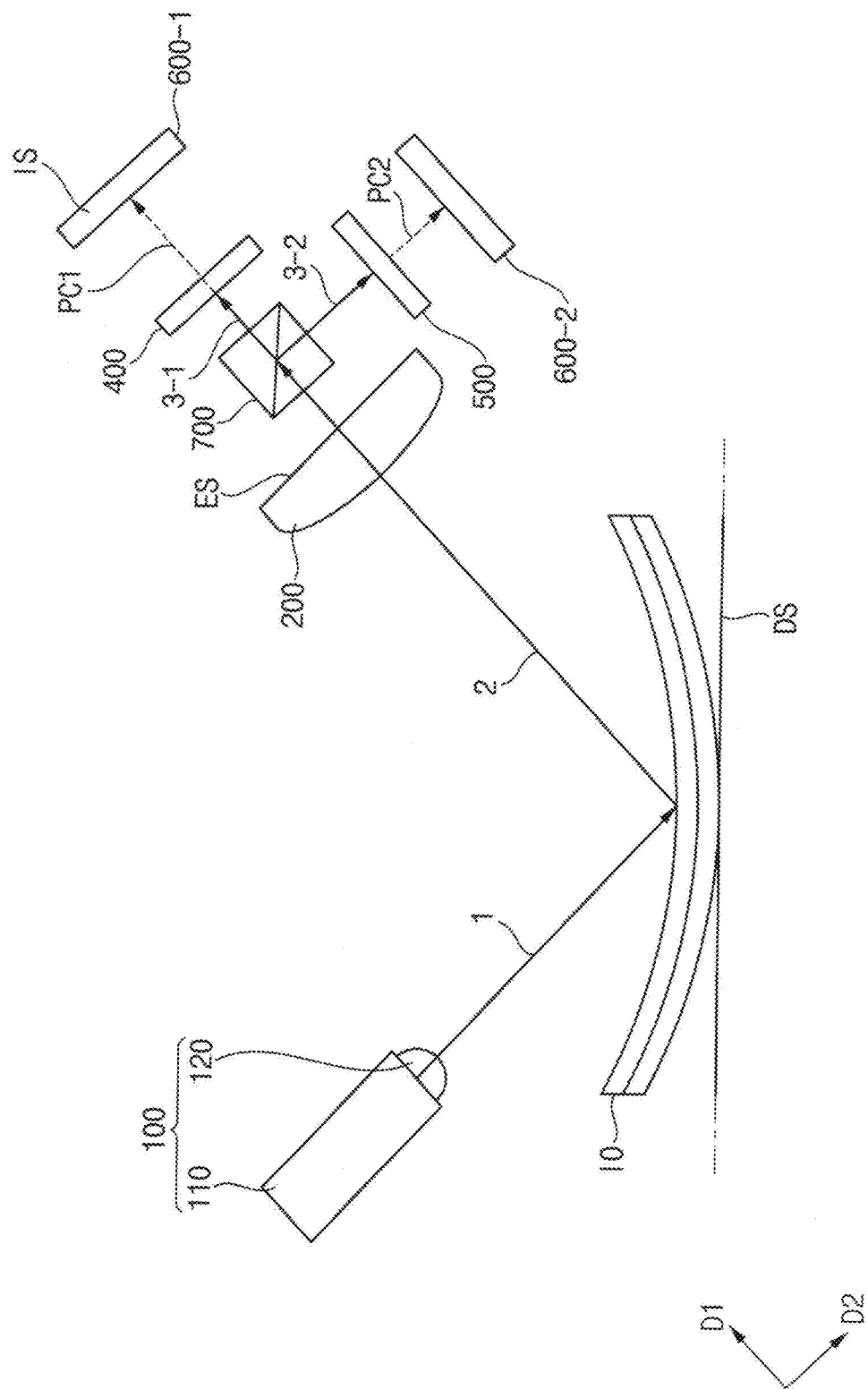
FIG. 17 is a configuration diagram illustrating an inspection system according to another embodiment
Figure 18:
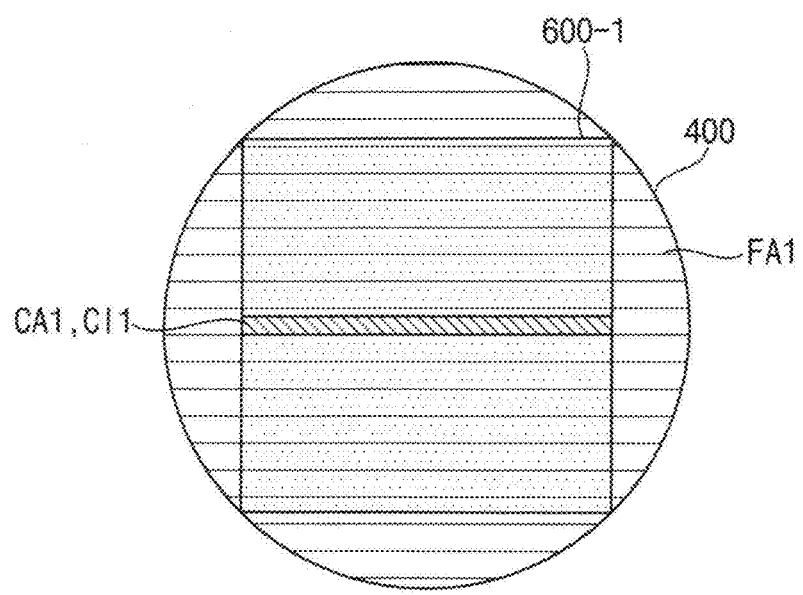
FIG. 18 is a diagram illustrating the first polarizer and the first image sensor of FIG. 17 overlapping each other when viewed from the first traveling direction.
Figure 19:
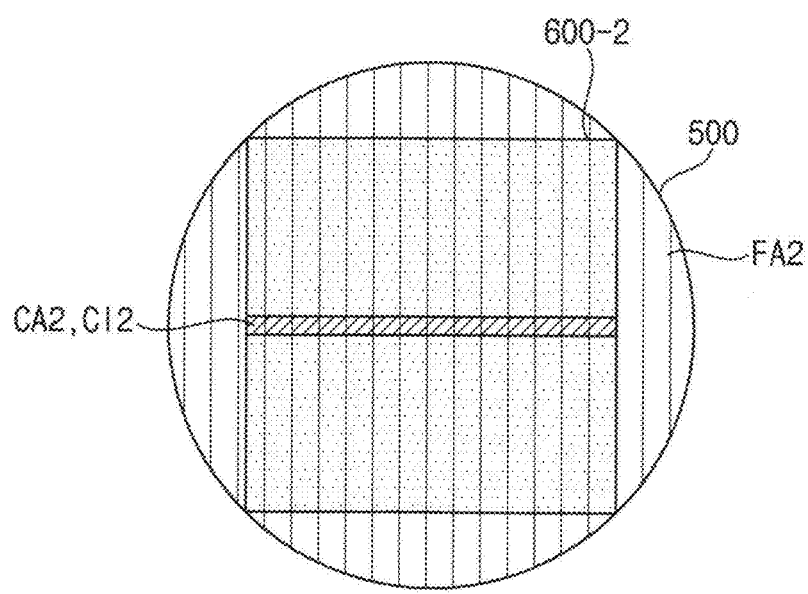
FIG. 19 is a diagram illustrating the second polarizer and the second image sensor of FIG. 17 overlapping each other when viewed from the first traveling direction.

FIG. 17 is a configuration diagram illustrating an inspection system according to another embodiment, and FIG. 18 is a diagram illustrating the first polarizer and the first image sensor of FIG. 17 overlapping each other when viewed from the first traveling direction, and FIG. 19 is a diagram illustrating the second polarizer and the second image sensor of FIG. 17 overlapping each other when viewed from the first traveling direction.

Referring to FIGS. 17 to 19, the inspection system 2000 according to another embodiment may be substantially the same as the inspection system 1000 described above with reference to FIG. 1, except for a shape and arrangement of the first polarizer 400 and the second polarizer 500, the first image sensor 600-1, the second image sensor 600-2 and the beam splitter 700.

In an embodiment, the beam splitter 700 may split the reflected light 2 into a first split light 3-1 and a second split light 3-2. Each of the first split light 3-1 and the second split light 3-2 may include the first polarization component PC1 and the second polarization component PC2.

In an embodiment, the first split light 3-1 may travel in a first travel direction D1, and the second split light 3-2 may travel in a second traveling direction D2 orthogonal to the first travel direction D1. In other words, the first split light 3-1 and the second split light 3-2 may be emitted from the beam splitter 700 and travel in a direction orthogonal to each other.

In this case, the first polarizer 400 may be arranged in line with the beam splitter 700 along the first traveling direction D1, and the second polarizer 500 may be arranged in line with the beam splitter 700 along the second traveling direction D2. Accordingly, the first split light 3-1 may pass through the first polarizer 400 after being emitted from the beam splitter 700, and the second split light 3-2 may pass through the second polarizer 500 after being emitted from the beam splitter 700.

In an embodiment, each of the first image sensor 600-1 and the second image sensor 600-2 may be a line scan camera. Accordingly, each of the first image sensor 600-1 and the second image sensor 600-2 may continuously capture an object at a preset time distance interval.

In addition, as shown in FIGS. 18 and 19, an area of the first filter area FA1 may be about 100% of the total area of the first polarizer 400 in a view from the second traveling direction D1, and an area of the second filter area FA2 may be about 100% of the total area of the second polarizer 500 in a view from the second traveling direction D2.

Accordingly, the first split light 3-1 may pass through the first filter area FA1 to have only the first polarization component PC1. Also, the second split light 3-2 may pass through the second filter area FA2 to have only the second polarization component PC2.

In an embodiment, the inspection system 2000 may include the first image sensor 600-1 and the second image sensor 600-2. The first image sensor 600-1 may be arranged in line with the first polarizer 400 along the first traveling direction D1, and the second image sensor 600-2 may be arranged in line with the second polarizer 500 along the second traveling direction D2.

In an embodiment, the first image sensor 600-1 may include the first capture area CA1, and the second image sensor 600-2 may include a second capture area CA2. Accordingly, the first captured image CI1 of the first polarization component PC1 may be generated in the first capture area CA1, and the second captured image CI1 of the second polarization component PC2 may be generated in the second capture area CA2. In other words, the first captured image CI1 for the first polarization component PC1 and the second captured image CI2 for the second polarization component PC2 may be simultaneously generated from the first image sensor 600-1 and the second image sensor 600-2, respectively.

Whether the inspection object IO is defective may be inspected by analyzing the first captured image CI1 and the second captured image CI2. In an embodiment, as shown in FIG. 2, the first polarization component PC1 may be obtained by reflecting the incident light 1 from the outer surface IO-S of the inspection object IO, the second polarization component PC2 may be obtained by reflecting the incident light 1 from the inner boundary surface IO-IBS of the inspection object IO. Accordingly, the defect of the outer surface IO-S of the inspection object JO may be inspected from the first captured image CI1 of the first polarization component PC1, and the defect of the inner boundary surface IO-IBS of the inspection object JO may be inspected from the second captured image CI2 of the second polarization component PC2. For example, the inspection system 1000 may inspect whether each of the outer surface IO-S of the inspection object IO and the inner boundary surface IO-IBS of the inspection object IO has pressure, protrusions, wrinkles, and the like.

Figure 20:
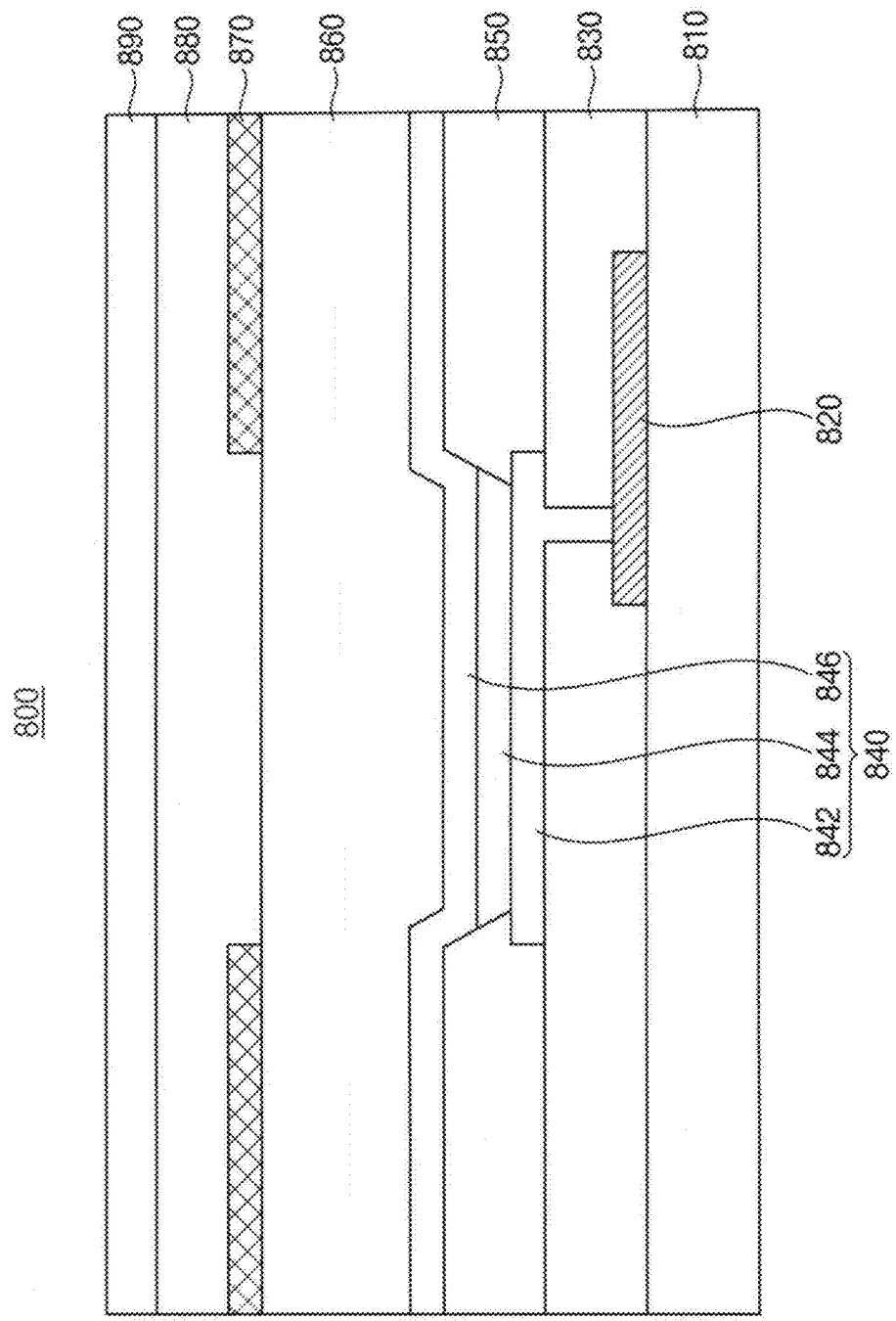
FIG. 20 is a cross-sectional view illustrating a display device which is an embodiment of an inspection object of FIG. 1.

FIG. 20 is a cross-sectional view illustrating a display device which is an embodiment of an inspection object of FIG. 1. For example, FIG. 20 is a cross-sectional view illustrating a sub-pixel of the display device 800 which is an embodiment of the inspection object IO.

Referring to FIG. 20, the display device 800 may include a substrate 810, a driving element 820, a protective layer 830, a light emitting device 840, a pixel defining layer 850, a thin film encapsulation layer 860, a black matrix 870, an overcoat layer 880, and a window 890.

The substrate 810 may include a transparent material or an opaque material. In an embodiment, examples of the material that can be used as the substrate 810 may include glass, quartz, plastic, and the like. These may be used alone or in combination with each other. In addition, the substrate 810 may be configured as a single layer or in multiple layers in combination with each other.

The driving element 820 may be disposed on the substrate 810. The driving element 820 may include at least one thin film transistor and at least one capacitor. The thin film transistor may include a semiconductor layer, a gate electrode, a source electrode and a drain electrode, and the capacitor may include a plurality of capacitor electrodes. A plurality of insulating layers may be disposed between the semiconductor layer, the gate electrode, the source electrode, the drain electrode, and the capacitor electrodes.

Although not shown, a buffer layer may be disposed between the substrate 810 and the driving element 820. The buffer layer may prevent impurities such as oxygen and moisture from diffusing onto the substrate 810 through the substrate 810. The buffer layer may include an inorganic insulating material such as a silicon compound or a metal oxide.

The protective layer 830 may be disposed on the driving element 820. The protective layer 830 may cover the driving element 820. In an embodiment, the protective layer 830 may be formed of an organic material. Examples of the organic material that can be used as the protective layer 830 may include polyacrylic resins, polyimide-based resins, acrylic resins, and the like. These may be used alone or in combination with each other.

The light emitting device 840 and the pixel defining layer 850 may be disposed on the protective layer 830. The light emitting device 840 may include an anode electrode 832, a light emitting layer 834, and a cathode electrode 836.

The anode electrode 842 may be disposed on the protective layer 830. The anode electrode 842 may be electrically connected to the driving element 820 through a contact hole defined in the protective layer 830.

The pixel defining layer 850 may be disposed on the protective layer 830. An opening exposing a portion of the anode electrode 842 may be defined in the pixel defining layer 850. In an embodiment, the pixel defining layer 850 may include an organic material.

The light emitting layer 844 may be disposed on the anode electrode 842. The cathode electrode 846 may be disposed on the light emitting layer 844. The light emitting layer 844 may emit light based on a voltage difference between the anode electrode 842 and the cathode electrode 846.

The thin film encapsulation layer 860 may be disposed on the cathode electrode 846. The thin film encapsulation layer 860 may protect the light emitting device 840 from impurities such as oxygen and moisture. In an embodiment, the thin film encapsulation layer 860 may include at least one inorganic encapsulation layer and at least one organic encapsulation layer.

The black matrix 870 may be disposed on the thin film encapsulation layer 860. The black matrix 870 may be disposed around the light emitting device 840. The black matrix 870 may be covered by the overcoat layer 880. The window 890 may be disposed on the overcoat layer 880. The window 890 may protect the components under the window 890. In an embodiment, an adhesive for adhering them may be interposed between the overcoat layer 880 and the window 890.

However, although an organic light emitting display device OLED is limitedly described for the display device 800 of the present invention, the configuration of the present invention is not limited thereto. In other embodiments, the display device 800 may include a liquid crystal display device LCD, a field emission display device FED, a plasma display device PDP, or an electrical display device, an electrophoretic display device EPD, a quantum dot display device, or an inorganic light emitting display device.

According to embodiments, defects at the outer surface of the display device 800 and/or the inner boundary surfaces between the layers (e.g., the overcoat layer 880, the window 890, etc.) of the display device 800 may be easily inspected using the inspection system 1000.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An inspection system comprising:
a single light source part which irradiates an incident light to an inspection object;
a main lens through which reflected light passes, wherein the reflected light is light reflected from the inspection object and includes a first polarization component and a second polarization component;
a beam splitter which splits the reflected light passing through the main lens into a first split light and a second split light;
a first polarizer including a first filter area which selectively passes the first polarization component therethrough;
a second polarizer including a second filter area which selectively passes the second polarization component therethrough; and
an image sensor which generates a first captured image for the first polarization component and a second captured image for the second polarization component,
wherein the first polarization component is obtained by reflecting the incident light from an outer surface of the inspection object, and
the second polarization component is obtained by reflecting the incident light from an inner boundary surface of the inspection object.

2. The inspection system of claim 1, wherein a first polarization direction of the first polarization component and a second polarization direction of the second polarization component are different from each other.

3. The inspection system of claim 2, wherein the first polarization direction and the second polarization direction are orthogonal to each other.

4. The inspection system of claim 3, wherein an angle of incidence of the incident light with respect to a normal direction of the outer surface or the inner boundary surface is about a Brewster angle.

5. The inspection system of claim 4, wherein the incident light is unpolarized.

6. The inspection system of claim 1, wherein the light source part includes:
an illumination device which generates the incident light; and
a collimating lens which collimates the incident light.

7. The inspection system of claim 1, wherein a first virtual extension line extending from a disposition surface on which the inspection object is disposed, a second virtual extension line extending from an exit surface of the main lens and a third virtual extension line extending from an incident surface of the image sensor meet at an intersection point.

8. The inspection system of claim 1, wherein the inspection object has a curvature.

9. The inspection system of claim 1, wherein the first split light and the second split light travel in a first traveling direction, and
the first polarizer and the second polarizer are arranged in line with the beam splitter along the first traveling direction.

10. The inspection system of claim 9, wherein the first polarizer further includes a first transmission area through which both the first polarization component and the second polarization component pass, and
the second polarizer further includes a second transmission area through which both the first polarization component and the second polarization component pass, and
the first split light passes through the first filter area and the second transmission area, and
the second split light passes through the first transmission area and the second filter area.

11. The inspection system of claim 10, wherein an area of the first filter area is about 50% or less of the total area of the first polarizer in a view from the first traveling direction, and
an area of the second filter area is about 50% or less of a total area of the second polarizer in the view from the first traveling direction.

12. The inspection system of claim 9, wherein the image sensor is arranged in a line with the first polarizer and the second polarizer along the first traveling direction,
and the image sensor generates the first captured image and the second captured image simultaneously.

13. The inspection system of claim 12, wherein the image sensor further generates a third captured image for the non-polarization component.

14. The inspection system of claim 9, wherein the main lens is a telecentric lens.

15. The inspection system of claim 1, wherein the first split light travels in a first traveling direction, and
the second split light travels in a second traveling direction orthogonal to the first traveling direction, and
the first polarizer is arranged in a line with the beam splitter along the first traveling direction, and
the second polarizer is arranged in a line with the beam splitter along the second traveling direction.

16. The inspection system of claim 15, wherein an area of the first filter area is about 100% of the total area of the first polarizer in a view from the first traveling direction, and
an area of the second filter area is about 100% of the total area of the second polarizer in a view from the second traveling direction.

17. The inspection system of claim 15, wherein the image sensor includes:
a first image sensor arranged in line with the first polarizer along the first traveling direction; and
a second image sensor arranged in line with the second polarizer along the second traveling direction, and
wherein the first image sensor generates the first captured image and the second image sensor generates the second captured image.

18. An inspection method comprising:
irradiating an incident light from a single light source part toward an inspection object;
passing a reflected light through a main lens, where the reflected light is light reflected from the inspection object and includes a first polarization component and a second polarization component;
splitting the reflected light passing through the main lens into a first split light and a second split light;
filtering the first polarization component and the second polarization component of the first split light and the second split light, respectively; and
generating a first captured image for the first polarization component and a second captured image for the second polarization component,
inspecting a defect on an outer surface of the inspection object from the first captured image, and inspecting a defect of an inner boundary surface of the inspection object from the second captured image after the first captured image and the second captured image are generated.

* * * * *